United States Patent
Li

(10) Patent No.: US 11,965,643 B1
(45) Date of Patent: Apr. 23, 2024

(54) SPLIT HEAD LAMP OF BUILT-IN ENERGY STORAGE ELEMENT

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 18/344,316

(22) Filed: Jun. 29, 2023

(30) Foreign Application Priority Data

May 26, 2023 (CN) .......................... 202310606906.7

(51) Int. Cl.
| | |
|---|---|
| *F21V 21/084* | (2006.01) |
| *F21L 4/00* | (2006.01) |
| *F21V 23/04* | (2006.01) |
| *F21V 23/06* | (2006.01) |

(52) U.S. Cl.
CPC .............. *F21V 21/084* (2013.01); *F21L 4/00* (2013.01); *F21V 23/04* (2013.01); *F21V 23/06* (2013.01)

(58) Field of Classification Search
CPC ........ F21V 21/084; F21V 23/04; F21V 23/06; F21L 4/00
See application file for complete search history.

(56) References Cited

U.S. PATENT DOCUMENTS

2019/0253670 A1* 8/2019 Chien ....................... F21S 4/28

OTHER PUBLICATIONS

Zhang et al., CN-105465672-A, Apr. 2016 (Year: 2016).*
Xu et al., WO-2021056378-A1, Apr. 2021 (Year: 2021).*

* cited by examiner

*Primary Examiner* — Mary Ellen Bowman

(57) ABSTRACT

The present application relates to a split head lamp of a built-in energy storage element. The split head lamp includes a head lamp body, a connecting line and an external power source. The head lamp body includes a light-emitting assembly, a circuit board, an energy storage element, and a Micro Control Unit (MCU) chip; the MCU chip is mounted on the circuit board; the circuit board is provided with an energized interface for plugging in the connecting line; power supply of the energy storage element and the external power source is regulated by a program stored in the MCU chip; and the energized interface is a Universal Serial Bus (USB) interface. a power supply system has better interchangeability; and through the present application, lighting may also be continuously temporarily provided when the external power source is replaced or is low, such that the split head lamp is more user-friendly.

10 Claims, 1 Drawing Sheet

SPLIT HEAD LAMP OF BUILT-IN ENERGY STORAGE ELEMENT

TECHNICAL FIELD

The present application relates to the technical field of lighting, and specifically to a split head lamp of a built-in energy storage element.

BACKGROUND

A head lamp is a head-mounted lighting device powered by a storage battery. The head lamp is a common lighting tool for night operation or underground operation because it can free out a user's hands. Because a power supply and a lamp body of a split head lamp are independent from each other, there is less burden on the front of the head when the user wears the head lamp, such that the split head lamp is more comfortable.

In a split head lamp in the related art, a battery and an interface are generally exclusively designed. For example, patent document with the application number of CN208204604U discloses a split head lamp. A power supply system, that is, an electric wire and a battery, of the split head lamp is exclusively designed in order to cooperate with an entire structure of the head lamp, such that the power supply system does not have good interchangeability. In addition, if a head lamp portion is not designed with a power supply element at all, when the battery of the head lamp is replaced, the user will be trapped in a dark environment without lighting if the user has no other lighting device, and it is also difficult for the user to replace the battery.

SUMMARY

The present application provides a split head lamp of a built-in energy storage element, to solve the problems that a power supply system of a split head lamp in the related art lacks interchangeability, and a user will be trapped in the dark when a battery is replaced.

In order to implement the above objective, the present application adopts the following technical solutions.

A split head lamp of a built-in energy storage element includes a head lamp body, a connecting line and an external power source. The head lamp body includes a light-emitting assembly, a circuit board, an energy storage element, and a Micro Control Unit (MCU) chip; the MCU chip is mounted on the circuit board; the circuit board is provided with an energized interface for plugging in the connecting line; and the light-emitting assembly, the circuit board, the energy storage element, and the MCU chip are electrically connected to each other.

Power supply of the energy storage element and the external power source is regulated by a program stored in the MCU chip.

The energized interface is a Universal Serial Bus (USB) interface.

Further, the head lamp body further includes a head lamp housing upper cover and a head lamp housing lower cover. The head lamp housing upper cover and the head lamp housing lower cover are snapped together, so as to wrap the circuit board and the energy storage element, but the energized interface is exposed.

The head lamp housing upper cover is provided with a mounting hole, and the light-emitting assembly is embedded in the mounting hole.

Further, the head lamp body further includes a gear switch, which is electrically connected to the circuit board.

The gear switch includes an on gear and an off gear; and when the gear switch is at the on gear, a power supply circuit on the circuit board is turned on, and the MCU chip only controls the external power source to supply power.

When the gear switch is at the off gear, the power supply circuit on the circuit board is disconnected.

Further, there are more than one on gears, and the on gears are divided into several levels; and when the gear switch is at the on gears of different levels, the MCU chip controls the circuit board to provide different powers to the light-emitting assembly.

Further, the gear switch further includes a temporary highlight gear; and when the gear switch is switched to such gear, the MCU chip controls the energy storage element and the external power source to supply power simultaneously.

Further, the energized interface includes at least one USB interface; and the USB interface includes, but is not limited to, Type-A, Mini-B, Micro-B, and Type-C.

Further, the MCU chip stores a wake-up program; when the external power source is a standard power bank, the gear switch is switched to the on gear, the MCU chip wakes up the standard power bank; and when the gear switch is switched to the off gear, the MCU chip controls the standard power bank to power off and enter a sleep mode.

Further, the MCU chip stores a quick charge handshake program; and when the external power source is a high-power power source supporting a quick charge protocol, the MCU chip sends a signal to complete a quick charge protocol handshake process with the external power source under the power supply of the energy storage element.

Further, a buzzer is mounted on the circuit board; the MCU chip stores an emergency power supply program; and when an output power of the external power source decreases or disappears, the MCU chip controls the energy storage element to normally supply power to the light-emitting assembly, and then controls the buzzer to emit a prompt sound.

Further, the MCU chip stores an emergency power supply program; and when an output power of the external power source decreases or disappears, the MCU chip controls the light-emitting assembly to flicker for 0-5 seconds under the power supply of the energy storage element, and then controls the energy storage element to normally supply power to the light-emitting assembly.

The present application has the following beneficial effects.

The present application may adapt to various types of external power sources including a standard power bank, such that a power supply system has better interchangeability.

2. Lighting may also be continuously temporarily provided when the external power source is replaced or is low, such that the split head lamp is more user-friendly.

Figure 1:
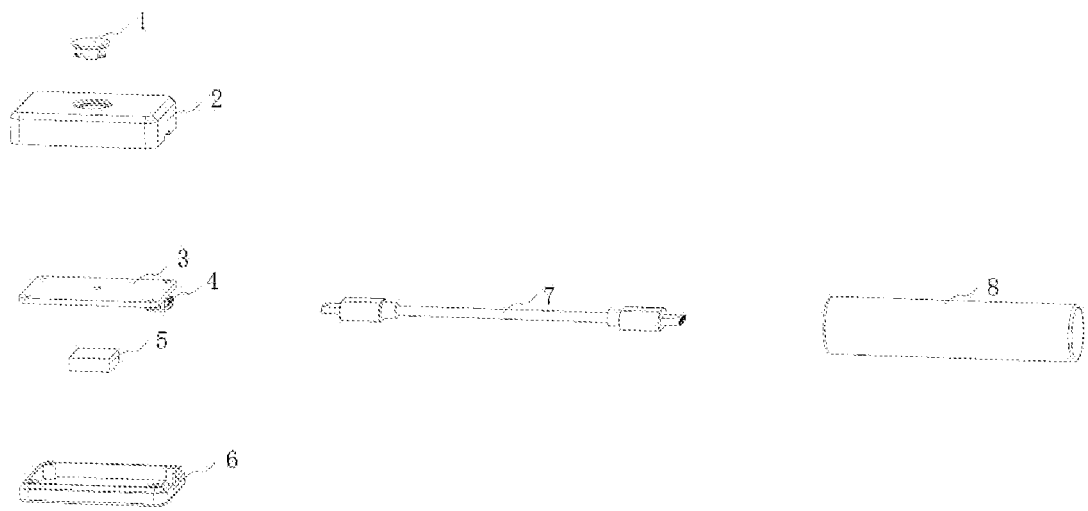
FIG. 1 is an explosive view of a split head lamp of a built-in energy storage element according to the present application.

Light-emitting assembly; 2. Head lamp housing upper cover; 3. Circuit board; 4. Energized interface; 5. Energy storage element; 6. Head lamp housing lower cover; 7. Connecting line; 8. External power source.

DETAILED DESCRIPTION OF THE EMBODIMENTS

In order to make objectives, technical solutions, and advantages of the present application clearer, the technical solutions of the present application will be clearly and completely described below with reference to the embodiments of the present application. It is to be noted that the described embodiments are only part of the embodiments of the present application, not all the embodiments. Based on the embodiments in the present application, all other embodiments obtained by those of ordinary skill in the art without creative work shall fall within the protection scope of the present application.

It is to be noted that, if there are directional indications (such as up, down, left, right, front, back, top, bottom, inside, outside, vertical, horizontal, longitudinal, counter-clockwise, clockwise, circumferential, radial, axial, etc.) involved in the embodiments of the present application, the directional indications are only used to explain the relative position relationship, movement, and the like between parts in a particular attitude (as shown in the figure), and if the particular attitude changes, the directional indications change accordingly.

The term "and/or" in the embodiments of this application is merely an association relationship describing related objects, which means that there may be three relationships, for example, A and/or B may indicate three cases: A exists alone, A and B exist simultaneously, and B exists alone.

The terms "first" and "second" are used for descriptive purposes only and are not to be construed as indicating or implying relative importance or implicitly specifying the number of technical features indicated. Therefore, features delimited with "first" or "second" may expressly or implicitly include at least one of the features. In the description of the present application, terms "include" and "have" and any variations thereof are intended to cover non-exclusive inclusions. For example, it is not limited for systems, products or devices including a series of components or units to listed components or units, and other components or units which are not listed or are inherent to these products or devices may be included instead. In the description of the present application, "a plurality of" means at least two, for example, two, three, or the like, unless otherwise explicitly specified.

References to "embodiments" here mean that particular features, structures or characteristics described in combination with the embodiments may be included in at least one embodiment of the present application. The presence of the phrase in various positions in the specification does not necessarily mean the same embodiment, nor is it a separate or alternative embodiment that is mutually exclusive with other embodiments. It is understood, both explicitly and implicitly, by those skilled in the art that the embodiments described here may be combined with other embodiments.

Figure 2:
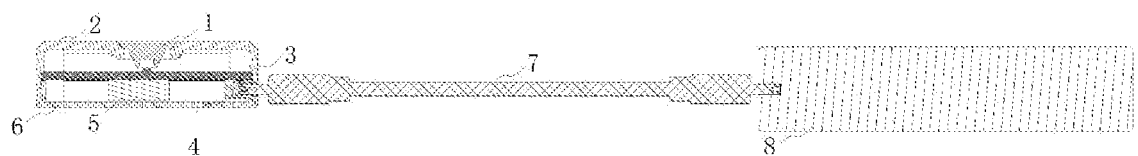
FIG. 2 is an overall schematic diagram of a split head lamp of a built-in energy storage element according to the present application.

As shown in FIG. 1 and FIG. 2, the present application is a split head lamp of a built-in energy storage element. The split head lamp mainly includes a head lamp body, a connecting line 7 and an external power source 8. The head lamp body is connected to the external power source 8 through the connecting line 7. The head lamp body consists of a light-emitting assembly 1, a head lamp housing upper cover 2, a circuit board 3 provided with an energized interface 4, an energy storage element 5 and a head lamp housing lower cover 6. Specifically, the head lamp housing upper cover 2 is provided with a mounting hole, and the light-emitting assembly 1 is embedded in the mounting hole and mounted on the head lamp housing upper cover 2; the head lamp housing upper cover 2 and the head lamp housing lower cover 6 are snapped together, so as to wrap the circuit board 3 and the energy storage element 5, but the energized interface 4 is exposed, such that the connecting line 7 is conveniently plugged in. In addition, in the present application, there may be one or a plurality of energized interfaces 4 designed, and the type of the energized interface is selected from Type-A, Mini-B, Micro-B and Type-C in a USB interface.

Figure 3:
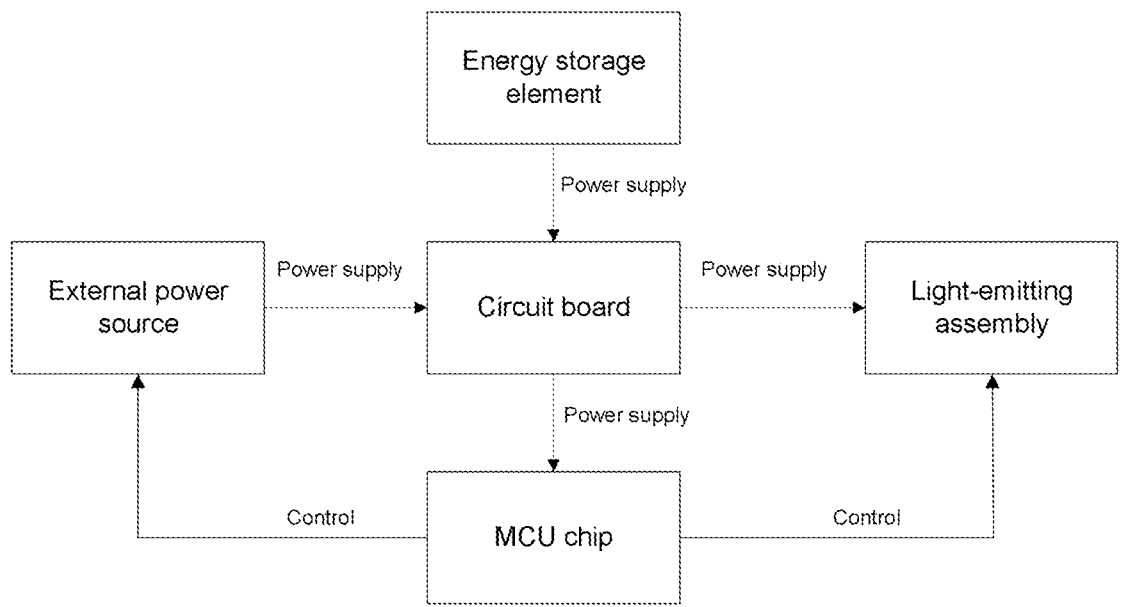
FIG. 3 is a control logic diagram among main elements of a split head lamp of a built-in energy storage element according to the present application.

The circuit board 3, the energy storage element 5, the light-emitting assembly 1 and the energized interface 4 are electrically connected to each other. An MCU chip is mounted on the circuit board 3, and apparently the MCU chip is also plugged in a circuit of the circuit board 3. After the external power source 8 is connected to the energized interface 4 by means of the connecting line 7, in the present application, the relationship between main elements is represented as a control logic diagram shown in FIG. 3. The energy storage element 5 and the external power source 8 may both supply power. For example, if the external power source is in a power supply state, generally, the energy storage element 5 cannot supply power to the circuit board 3 as being controlled by the MCU chip, and the circuit board can only be charged by the external power source 8.

A gear switch (of which position is flexible and is not marked in the figure) is also provided on the head lamp body of the present application. The gear switch is also electrically connected to the circuit board 3, and at least includes an on gear and an off gear, which respectively enable the MCU chip to control the on and off of a power supply circuit of the light-emitting assembly 1. When the gear switch is provided with more gears, the on gear is divided into different levels; and when the gear switch is operated to different on gears, the MCU chip limits, with different limitations, the circuit board 3 to provide different powers to the light-emitting assembly 1, so as to cause the light-emitting assembly to have different levels of brightness.

The external power source 8 may be a dedicated battery pack or a standard power bank. When the external power source 8 is the standard power bank, since the standard power bank often has the function of entering in a sleep mode when not supplying power for a long time or under a low load, in order to prevent a power source button of the standard power bank from being pressed again when the head lamp is restarted, so as to restart external power supply, the MCU chip is designed with a wake-up program, the wake-up program may send a control signal to make the standard power bank to be continuously woken up when the lamp is on, and can disconnect the standard power bank to let the standard power bank to enter the sleep mode to save power consumption, without manually pressing the power source button of the standard power bank. During the process, the MCU chip relies on the energy storage element 5 to maintain its own power supply, so as to maintain a control logic.

In order to enable the head lamp in the present application to have a higher power, a quick charge protocol handshake program may also be set in the MCU chip. When the external power source 8 outputs a high voltage on the basis of a quick charge protocol, the MCU chip sends a signal to complete a quick charge protocol handshake process with the external power source 8 under the power supply of the energy storage element 5, such that a power-down action (at 1.4 s of the quick charge handshake process, a USB powers down and restarts) during the quick charge protocol handshake process may be avoided, so as to ensure the stability of power supply to the MCU.

Considering that the power supply power of the external power source 8 suddenly drops or even disappears when the external power source is replaced or is low, a buzzer may also be mounted on the circuit board, and an emergency power supply program is further carried in the MCU chip, such that when the above problem occurs, and when the gear switch is not at the off gear, the energy storage element 5 is controlled to temporarily supply power to the light-emitting assembly 1; and during temporary power supply, the buzzer emits a prompt sound to remind a user. In other embodiments, the MCU chip may also be enabled to control the light-emitting assembly 1 to flicker for 0-5 seconds, and then control the energy storage element 5 to supply power to the light-emitting assembly 1.

Considering that the user may need a temporary output with a higher power, a temporary highlight gear may be set in the gear switch. When the user switches the gear switch to this gear, the MCU chip starts the emergency power supply program, such that the energy storage element and the external power source 8 for normal power supply simultaneously supply power to the light-emitting assembly 1, so as to obtain the larger temporary output with a high power.

The above embodiments merely illustrate the implementations of the present application, which are specifically described in detail, but are not to be construed as limiting the scope of the present patent for the present application. It should be pointed out that those of ordinary skill in the art can also make some modifications and improvements without departing from the concept of the present application, and these modifications and improvements all fall within the scope of protection of the present application. Accordingly, the scope of the patent of the present application should be subject to the appended claims.

What is claimed is:

1. A split head lamp of a built-in energy storage element, comprising
a head lamp body,
a connecting line and
an external power source, wherein
the head lamp body comprises a light-emitting assembly, a circuit board, an energy storage element, and a Micro Control Unit (MCU) chip; the MCU chip is mounted on the circuit board; the circuit board is provided with an energized interface for plugging in the connecting line; the light-emitting assembly, the circuit board, the energy storage element, and the MCU chip are electrically connected to each other;
power supply of the energy storage element and the external power source is regulated by a program stored in the MCU chip; and
the energized interface is a Universal Serial Bus (USB) interface;
wherein the head lamp body further comprises a head lamp housing upper cover and a head lamp housing lower cover; the head lamp housing upper cover and the head lamp housing lower cover are snapped together, so as to wrap the circuit board and the energy storage element, but the energized interface is exposed; and
the head lamp housing upper cover is provided with a mounting hole, and the light-emitting assembly is embedded in the mounting hole.

2. The split head lamp of a built-in energy storage element as claimed in claim 1, wherein the head lamp body further comprises a gear switch, which is electrically connected to the circuit board;
the gear switch comprises an on gear and an off gear; when the gear switch is at the on gear, a power supply circuit on the circuit board is turned on, and the MCU chip only controls the external power source to supply power; and
when the gear switch is at the off gear, the power supply circuit on the circuit board is disconnected.

3. The split head lamp of a built-in energy storage element as claimed in claim 2, wherein there are more than one on gears, and the on gears are divided into several levels; and when the gear switch is at the on gears of different levels, the MCU chip controls the circuit board to provide different powers to the light-emitting assembly.

4. The split head lamp of a built-in energy storage element as claimed in claim 2, wherein the gear switch further comprises a temporary highlight gear; and when the gear switch is switched to this gear, the MCU chip controls the energy storage element and the external power source to supply power simultaneously.

5. The split head lamp of a built-in energy storage element as claimed in claim 3, wherein the gear switch further comprises a temporary highlight gear; and when the gear switch is switched to this gear, the MCU chip controls the energy storage element and the external power source to supply power simultaneously.

6. The split head lamp of a built-in energy storage element as claimed in claim 1, wherein the energized interface comprises at least one USB interface; and the USB interface comprises, but is not limited to, Type-A, Mini-B, Micro-B, and Type-C.

7. The split head lamp of a built-in energy storage element as claimed in claim 2, wherein the MCU chip stores a wake-up program; when the external power source is a standard power bank, the gear switch is switched to the on gear, the MCU chip wakes up the standard power bank; and when the gear switch is switched to the off gear, the MCU chip controls the standard power bank to power off and enter a sleep mode.

8. A split head lamp of a built-in energy storage element, comprising
a head lamp body,
a connecting line and
an external power source, wherein
the head lamp body comprises a light-emitting assembly, a circuit board, an energy storage element, and a Micro Control Unit (MCU) chip; the MCU chip is mounted on the circuit board; the circuit board is provided with an energized interface for plugging in the connecting line; the light-emitting assembly, the circuit board, the energy storage element, and the MCU chip are electrically connected to each other;
power supply of the energy storage element and the external power source is regulated by a program stored in the MCU chip; and
the energized interface is a Universal Serial Bus (USB) interface;
wherein the MCU chip stores a quick charge handshake program; and when the external power source is a high-power power source supporting a quick charge protocol, the MCU chip sends a signal to complete a quick charge protocol handshake process with the external power source under the power supply of the energy storage element.

9. A split head lamp of a built-in energy storage element, comprising
a head lamp body,
a connecting line and
an external power source, wherein
the head lamp body comprises a light-emitting assembly, a circuit board, an energy storage element, and a Micro Control Unit (MCU) chip; the MCU chip is mounted on the circuit board; the circuit board is provided with an energized interface for plugging in the connecting line; the light-emitting assembly, the circuit board, the energy storage element, and the MCU chip are electrically connected to each other;
power supply of the energy storage element and the external power source is regulated by a program stored in the MCU chip; and
the energized interface is a Universal Serial Bus (USB) interface;
wherein a buzzer is mounted on the circuit board; the MCU chip stores an emergency power supply program; and when an output power of the external power source decreases or disappears, the MCU chip controls the energy storage element to normally supply power to the light-emitting assembly, and then controls the buzzer to emit a prompt sound.

10. The split head lamp of a built-in energy storage element as claimed in claim 1, wherein the MCU chip stores an emergency power supply program; and when an output power of the external power source decreases or disappears, the MCU chip controls the light-emitting assembly to flicker for 0-5 seconds under the power supply of the energy storage element, and then controls the energy storage element to normally supply power to the light-emitting assembly.

* * * * *